United States Patent Office 3,417,058
Patented Dec. 17, 1968

3,417,058
BRIGHTENED FINE FABRICS
Albert F. Strobel, Delmar, and Sigmund C. Catino, Castleton, N.Y., assignors to GAF Corporation, a corporation of Delaware
No Drawing. Filed Mar. 14, 1966, Ser. No. 533,813
10 Claims. (Cl. 260—75)

This invention relates to the combination of a new class of fluorescent naphthotriazole compounds possessing new and useful properties which render them particularly useful as fluorescent optical bleaching or whitening agents with fine fabrics such as nylon, Dacron and Orlon.

It is well established that textiles tend to develop a yellowish shade on ageing which cannot be removed by ordinary methods of bleaching or washing. The heretofore used methods of "blueing" white materials with blue pigments or fugitive blue dyestuffs have become quite obsolete in modern laundry practice and have been largely superseded by methods employing fluorescent optical bleaching agents or brighteners as additives to the soap or detergent in the washing bath. These brightening agents are usually conveniently supplied commercially in the form of intimate admixtures with the soap or detergent in bars, flakes powders, etc. The fluorescent optical bleaching agents perform their desired function by virtue of their characteristic absorption of ultraviolet radiations and subsequent conversion of this energy to light energy within the visible spectrum. This converted and emitted light energy tends to neutralize any yellowness of the material and thereby increase the apparent whiteness thereof.

It is known that blue-fluorescing 2-(4-atrylphenyl)-2N-naphtho[1,2] triazole compounds (containing a sulfonic acid group in the stilbene nucleus) can be used from a neutral to a weakly acid bath for the brightening of wool and cellulose fibers. None of them, however, has appreciable affinity for synthetic fibers such as Dacron, Orlon, nylon, etc., made from terephthalic acid and ethylene glycol, acrylonitrile, adipic acid and ethylene diamine.

It is also known that the sulfonic acid substituent in the stilbene nucleus of the foregoing 2-(4-styrylphenyl)-2H-naphtho[1,2]triazoles can be replaced by cyano, sulfone and sulfonamide groups to produce optical brightening agents which are useful, for example, in brightening paraffin, polymeric synthetic materials such as polymeric amides from ethylene diamine and adipic acid, polyvinyl chloride, polyacrylonitrile, polyacrylic acid esters and copolymers of these materials, cosmetic preparations, ointment bases and the like.

It has now been discovered that certain fluorescent naphthotriazoles, free from sulfonic acid groups as well as cyano, sulfone and sulfonamide groups, are readily incorporated in specified amounts into nylon, Orlon, and Dacron fibers as effective brightening agents. These new fluorescent naphthotriazoles are especially unusual in that they have great affinity for nylon and Dacron and superior brightening power on these materials over the corresponding sulfones and sulfonamide substituted 2-(4-styrylphenyl)-2H-naphtho[1,2]triazoles as well as cyano substituted derivatives of the same. In fact, it has been found that these new fluorescent naphthotriazoles have exceedingly high brightness and whitening power in melt application on Dacron polyester fabric of any brightener known or tested. In this connection, it is interesting to note that these fluorescent naphthotriazoles are outstanding on nylon, Orlon, and Dacron and are adaptable on films, fibers and fabrics made from these materials.

Certain of the new fluorescent naphthotriazoles, i.e., the ethyl and 2-hydroxyethyl esters of 4-[2-(2-naphtho[1,2]triazolyl)]-2-stilbene-carboxylic acids, which are capable of taking part in transesterification or esterification reactions, may be copolymerized with a monomer, e.g., terephthalic acid in the preparation of polyester from, for example, ethylene glycol and terephthalic acid, to give a polymer in which the brightener moiety has become chemically bound as part of the polymer chain.

The fluorescent naphthotriazoles used in the present invention are characterized by the following general formula:

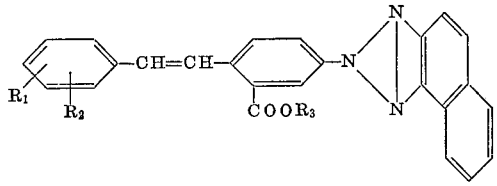

wherein $R_1$ and $R_2$ represent either hydrogen, halogen such as chlorine, bromine or fluorine, lower alkyl such as methyl, ethyl, propyl, isopropyl, butyl, isobutyl, and lower alkoxy such as methoxy, ethoxy, propoxy, butoxy, isobutoxy, cyclohexyloxy, and the like, $R_3$ represents either alkyl, such as methyl, ethyl, propyl, butyl, octyl, octadecyl, etc., hydroxyalkyl such as hydroxyethyl, hydroxypropyl, hydroxybutyl, etc., polyhydric alcohols, e.g., 2,3-dihydroxypropyl, 2-trihydroxymethyl)ethyl, aryl, such as phenyl, halophenyl, e.g., chlorophenyl, bromophenyl and fluorophenyl, lower alkoxyphenyl, e.g., anisyl, and lower alkylphenyl, e.g., tolyl and xylyl, dialkylaminoalkyl such as dimethylaminomethyl, dimethylaminoethyl, dimethylaminopropyl, dimethylaminobutyl, diethylaminoethyl, diethylaminobutyl, dipropylaminoethyl, dipropylaminobutyl, dibutylaminoethyl, dibutylaminobutyl, etc. or morpholino-N-alkyl, piperiodino-N-alkyl wherein the alkyl group contains from 1 to 4 carbon atoms.

The naphthotriazoles having the foregoing general formula are prepared by diazotizing a stilbene of the formula:

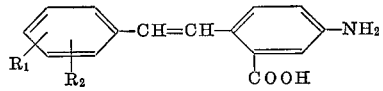

wherein $R_1$ and $R_2$ have the same values as above, in acetic acid by adding hydrochloric acid and sodium nitrite preferably in aqueous solution to the amine at a temperature of 0–10° C. After diazotization is complete, 2-naphthylamine, as the hydrochloride or as a slurry is added to the diazo in equimolar amount, care being exercised that the reaction remains weakly acid. After coupling has occurred, the monoazo dye is oxidized to the triazole, for example, by heating with copper sulfate in a basic solvent such as pyridine or β,α-picoline, and the like. The resulting compound is then treated with thionyl chloride in the known manner to convert the carboxylic acid group to the acid chloride. The lattter is then further reacted with an appropriate monohydric or dihydric alcohol, dialkylaminoalkanol or morpholinoalkanol in the known manner to give the desired naphthotriazoles.

Alternatively, the fluorescent naphthotriazoles can be produced from the intermediates of the following formula:

(a) 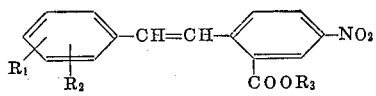

wherein $R_1$, $R_2$ and $R_3$ have the same values as above by reducing the nitro group to the amino group, diazotizing and coupling with 2-naphthylamine and then oxidizing the thus formed azo dye to form the triazole compound.

The stilbene intermediates characterized by Formula a are prepared in accordance with the method of Pfeiffer, Berichte, 44, 1119, by condensing the methyl ester of 6-nitro-o-tolucarboxylic acid with any one of the following benzaldehydes or by reaction of the benzaldehyde with 5-nitro-o-toluamide in accordance with the method of Macovski, Georgescu and Bachmeyer, Ber. 74B, 1279–84 (1941); Chem. Abstracts, 36, 4813 (1942):

benzaldehyde
o-, m- and p-bromobenzaldehyde
o-, m- and p-chlorobenzaldehyde
2,3-, 2,4-, 2,5-, 3,4- and 2,6-dichlorobenzaldehyde
o-, m- and p-tolualdehyde
5-bromo-2-methoxybenzaldehyde
5-chloro-2-methoxybenzaldehyde
2-methoxy-m-tolualdehyde
5-methoxy-o-tolualdehyde
3-bromo-4-ethoxybenzaldehyde
4-butoxy-3-chlorobenzaldehyde
o-, m- and p-methoxybenzaldehyde
2,4-dibromobenzaldehyde
o-, m- and p-ethoxybenzaldehyde
3,4-diethoxybenzaldehyde
o-, m- and p-propoxybenzaldehyde
2,3-dimethoxybenzaldehyde
o-, m- and p-butoxybenzaldehyde
p-fluorobenzaldehyde
4-chloro-o-tolualdehyde
3-chloro-p-tolualdehyde
2,4-, 2,5- and 3,5-dimethylbenzaldehyde
4- and 5-isopropyl-o-tolualdehyde
2,4- and 2,5-diethylbenzaldehyde
p-tertiarybutylbenzaldehyde
p-ethylbenzaldehyde The foregoing condensation products which contain a carboxylic acid group in the 2-position and a nitro group in the 4-position of the stilbene nucleus are then converted to the corresponding acid chlorides in the known manner, i.e., by treatment with thionyl chloride and finally reacting the latter with an appropriate aliphatic monohydric or dihydric alcohol, dialkylaminoalkanol, etc., in the conventional way. The resulting product is then subjected to the reduction of the nitro group to yield the 4-amino stilbene derivative. The resulting amino stilbene intermediate is then further treated by diazotization and coupling, followed by oxidation as will be noted from the following examples.

As examples of monohydric, dihydric, and polyhydric alcohols, dialkylaminoalkanols and morpholinaminoalkanols which are reacted with the carboxylic acid chloride, substituted naphthotriazoles or the 4-amino stilbene derivatives, the following are illustrative:

Monohydric alcohols and phenols methanol
ethanol
propanol
butanol
1-pentanol
2-pentanol
1-hexanol
phenol
m,p-chlorophenol
m,p-cresol Dihydric alcohols ethylene glycol
trimethylene glycol
1,4-butanediol
1,6-hexanediol Polyhydric alcohols glycerol
pentaerythritol Dialkylaminoalkanols dimethylaminomethanol
dimethylaminoethanol
dimethylaminopropanol
dimethylaminobutanol
diethylaminoethanol
diethylaminopropanol
diethylaminobutanol
dipropylaminomethanol
dipropylaminoethanol
dipropylaminobutanol
dibutylaminomethanol
dibutylaminoethanol
dibutylaminobutanol Heteroalkanols morpholinomethanol
morpholinoethanol
morpholinopropanol
morpholinobutanol
piperidinomethanol
piperidinoethanol
hexamethyleniminoethanol In connection with the naphthotriazoles of the foregoing general formula, it is to be noted that those which have a tertiary amino substituent are slightly water soluble and dye nylon and Orlon. Those which are free from such substituent are water insoluble and dye nylon and Dacron.

The following examples will show the preparation of both the partially water soluble and water insoluble types and their application to fine fabrics.

EXAMPLE 1

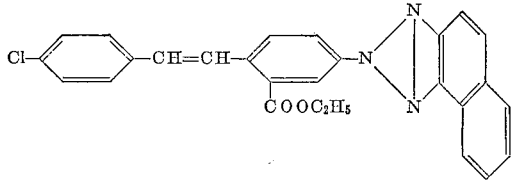

To a mixture of 700 grams of absolute ethanol and 350 grams of toluene was added 35.5 grams of 4'-chloro-4-[2-(2H-naphtho[1,2]triazolyl)]-2-stilbenecarbonyl chloride. The mixture was stirred for five hours at 76° C., cooled to 2° C., and the crude product was separated by filtration. The filter cake was washed on the funnel with 100 grams of cold (0° C.) anhydrous ethanol and then recrystallized from ethylene glycol monomethyl ether. After drying at 80° C., 27 grams of ethyl 4'-chloro-4-[2-(2H-naphtho[1,2]triazolyl)]-2-stilbenecarboxylate were obtained as a yellow powder.

The brightener was applied to polyester fiber (Dacron) as follows: 50 mg. of brightener were dissolved in 100 cc. of dimethylformamide. The dyebath liquor was prepared from 5.0 cc. of the above brightener solution and 145 cc. of 0.1% Peregal O aqueous solution. Peregal O is a polyoxyethylene condensation surfactant. A 5.0 g. swatch of Dacron was introduced into the dyebath and the mixture was agitated for 1 hour at 190–200° F. The cloth was removed, rinsed and dried. The treated cloth shows a much greater whiteness than untreated Dacron cloth.

The 4'-chloro-4-[2-(2H-naphtho[1,2]triazolyl)]-2-stilbenecarbonyl chloride utilized in this example was prepared by adding 130 grams of 4'-chloro-4-[2-(2H-naphtho[1,2]triazolyl)]-2-stilbenecarboxylic acid to a mixture of 350 grams of thionyl chloride and 1 gram of pyridine. After stirring for 5 hours at 85°–95° C., the excess thionyl chloride was distilled under reduced pressure and the solid residue of the acid chloride weighed 130 g. and melted at 187.8°–190.0° C. uncorrected.

The preparation of 4'-chloro-4-[2-(2H-naphtho[1,2] triazolyl)]-2-stilbenecarboxylic acid is as follows:

To a solution of 159 grams of 4-amino-4'-chloro-2- stilbene-carboxylic acid in 2400 cc. of glacial acetic acid was added 304 cc. of concentrated hydrochloric acid and 1500 cc. of water. The mixture was cooled to 0° C. and a solution of 41 grams of sodium nitrite in 100 cc. of water was added to effect the diazotization. After stirring for 30 minutes at 0° C.–5° C., the excess of nitrous acid was reacted with enough sulfamic acid to give a negative test for nitrite on starch-iodide paper. A warm solution of 92.2 grams of 2-naphthylamine in 1500 cc. of water containing 68 cc. of concentrated hydrochloric acid was added gradually to the diazo solution maintained at 5° to 10° C. The coupling reaction was completed by adding over a period of one hour 864 grams of sodium acetate trihydrate followed by stirring of the mixture for 16 hours. The precipitated o-aminoazo dyestuff was separated by suction filtration and washed thoroughly on the funnel with warm (60° C.) water to give 700 grams of wet filter cake.

The entire wet cake of dye was dissolved at 95° C. in 3000 cc. of mixed picolines and treated with a solution of 362 grams cupric sulfate pentahydrate in 725 cc. of water. After stirring the mixture for 2 hours at the reflux temperature, a solution of 116 grams of sodium sulfide flakes in 500 cc. of water was added. The charge was clarified at 90° C. to remove the copper sulfide precipitate. The clear filtrate was treated with aqueous sodium hydroxide solution to pH 10 and then distilled with steam to separate the picoline. The product was filtered from the residue after the steam distillation, slurried in 6000 cc. of water at 90° C. and treated with concentrated hydrochloric acid to Congo blue acidity. After filtering and washing the filter cake free of acid with water the material was dried at 110° C. under reduced pressure to give 200 grams of 4'-chloro-4-[2-(2H-naphtho[1,2]triazolyl)]-2-stilbenecarboxylic acid, a yellow powder which melted at 274–275.8° C. uncorrected.

The 4-amino-4'-chloro-2-stilbenecarboxylic acid used above was obtained as follows:

A solution of 200 grams of 4'-chloro-4-nitro-2-stilbenecarboxylic acid (prepared from 4-chlorobenzaldehyde and 5-nitro-o-toluamide by the method of Macovski, Georgescu and Bachmeyer, Ber. 74B, 1279–84 (1941); Chem. Abstracts, 36, 4813 (1942)) in 540 grams of N,N-dimethylformamide was reduced with 200 grams of iron borings etched with 50 grams of concentrated hydrochloric acid in 300 grams of water containing 800 grams of N,N-dimethyl formamide.

EXAMPLE 2

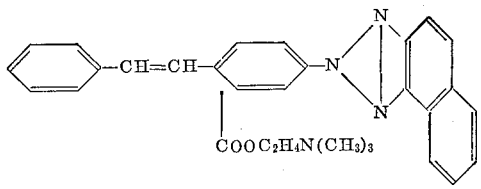

A mixture of 8.2 grams of 4-[2-(2H-naphtho[1,2]triazolyl)]-2-stilbencarbonyl chloride, 17.8 grams of 2-(N,N-dimethyl)aminoethanol and 100 grams of toluene was heated for 6 hours at 110° C. After evaporation of the toluene, the residue was washed with water and recrystallized from 480 grams of ethanol to yield 2-(N,N-dimethyl)aminoethyl-4-[2-(2H-naphtho[1,2]triazolyl)]-2-stilbenecarboxylate as a yellow powder.

The compound 4-[2-(2H-naphtho[1,2]triazolyl)]-2-stilbencarbonyl chloride was synthesized according to the manner described in Example 1 for the preparation of 4'-chloro-4-[2-(2H-naphtho[1,2]triazolyl)]-2-stilbencarbonyl chloride starting with 36.4 grams of 4-nitro-2-stilbenecarboxylic acid (obtained from benzaldehyde and the methyl ester of 5-nitro-o-toluic acid according to the method of Pfeiffer and Matton, Ber. 44, 1119) in the manner given in Example 1.

The brightener was applied to polyacrylonitrile fiber (Orlon) as follows: 50 mg. of brightener were dissolved in 100 cc. of dimethylformamide. 5.0 cc. of this solution (=.0025 g. of brightener) were added to a dyebath containing 145 cc. of 1% acetic acid. A 5.0 g. swatch of Orlon was added and the dyebath heated and agitated at 190–200° F. for 1 hour, after which the material was removed, rinsed and dried. The treated cloth was brightened to a high degree in contrast to an untreated swatch.

EXAMPLE 3

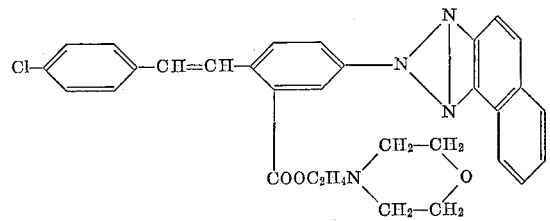

67 grams of 4'-chloro-4-[2-(2H-naphtho[1,2]triazolyl)]-2-stilbencarbonyl chloride, prepared in accordance with Example 1 above, were condensed with 59 grams of morpholinoethanol in accordance with the procedure of Example 2. The brightener was applied to Dacron fiber in accordance with Example 1 and the treated cloth was brightened to a degree in contrast to untreated cloth. A distinct brightening effect was obtained when the brightener was applied to Orlon polyacrylonitrile fabric according to the method of Example 2.

EXAMPLE 4

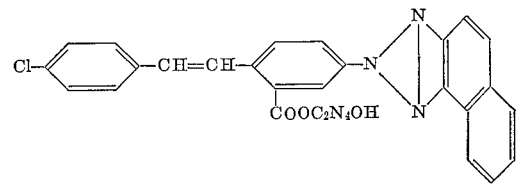

A mixture of 200 grams of ethylene glycol, 200 grams of toluene and 8.9 grams of 4'-chloro-4[2-(2H-naphtho[1,2]triazolyl)]-2-stilbenecarbonyl chloride (prepared as in Example 1) was heated for 16 hours at 90–95° C. After distillation of the toluene and most of the ethylene glycol under reduced pressure the residue was slurried in water, filtered, and the filter cake was recrystallized from N,N-dimethylformamide to give 2-hydroxyethyl 4'-chloro-4[2-(2H-naphtho[1,2]triazolyl)]-2-stilbenecarboxylate.

This brightener is copolymerized into the polyester fiber as follows:

A mixture of 10 grams of dimethyl terephthalate, 4.85 grams of ethylene glycol, 0.3 gram of the brightener and 0.003 gram of metallic sodium, as a catalyst, is heated for 3 hours at 200° C. in a stream of pure nitrogen. The low molecular weight polymer is then heated at 280° C. for 30 minutes, then heated further for 10 hours under reduced pressure. During the heating cycle, a slow current of nitrogen is introduced through a capillary tube. The final product melts at 260° C. The methyl alcohol formed as a by-product of the ester interchange is removed during the heating period. The final product as formed is extruded in molten form as a ribbon, cooled with a water spray, and then cut into chips. The chips are melted in the absence of air and water, then extruded through orifices to give them the desired shape. The shaped articles can be converted into fibers in continous filament form or cut into short segments as staple. Both filaments and short segments showed a considerable whitening effect.

EXAMPLE 5

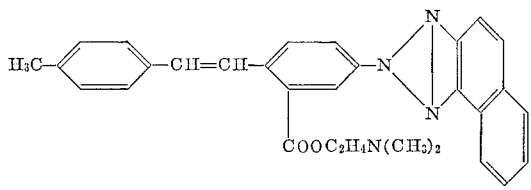

p-Tolualdehyde was condensed with 5-nitro-o-toluamide (method of Macovski, Georgescu and Bachmeyer, Ber. 74B, 279–84 (1941)) to give 4'-methyl-4-nitro-2-stilbenecarboxylic acid, M.p. 239.4–241.4° C. uncorrected.

In accordance with the procedures given in Example 1, 4'-methyl-4-nitro-2-stilbenecarboxylic acid was reduced, diazotized and coupled to 2-naphthylamine. The resultant o-aminoazo compound was oxidized to the triazole and then treated with thionyl chloride to yield 4'-methyl-4-[2-(2H-naphtho[1,2]triazolyl)]-2-stilbenecarbonyl chloride. Reaction of the carbonyl chloride derivative with 2-(N,N-dimethyl)aminoethanol by the process given in Example 2 afforded the brightner 2-(N,N-dimethyl)aminoethyl 4' - methyl-4-[2-(2H - naphtho[1,2]triazolyl)]-2-stilbenecarboxylate.

This brightener was applied to polyacrylonitrile fiber (Orlon) in the manner given in Example 2 and was found to impart a distinct whitening effect to the fabric with a pleasant whitish hue of fluorescence.

EXAMPLE 6

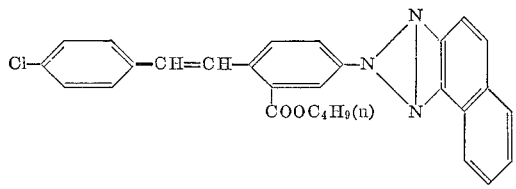

If, in Example 1, p-chlorobenzaldehyde and ethanol are replaced by 2,4-dichlorobenzaldehyde and n-butanol respectively there is produced the brightener n-butyl 2',4'-dichloro - 4 - [2-(2H - naphtho[1,2]triazolyl)]-2-stilbenecarboxylate. This brightener was applied to polyamide (nylon) fabric employing the method given in Example 1 for the application of a brightener to polyester (Dacron) fabric. The treated nylon appeared much whiter than the untreated fabric.

EXAMPLE 7

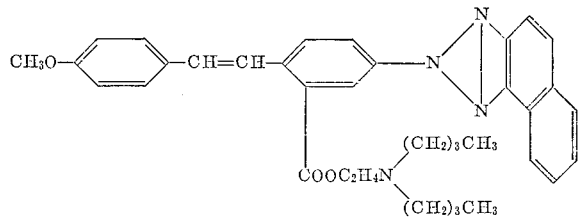

A mixture of 27 grams of 4-methoxybenzaldehyde, 36 grams of 5-nitro-o-toluamide and 12 grams of sodium methylate dissolved in 250 grams of methanol was allowed to react (method of Macovski, Georgescu and Bachmeyer, Ber. 74B, 1279–84 (1941)) to produce 4'-methoxy-4-nitro-2-stilbenecarboxylic acid.

After, as shown in Example 1, reduction of the nitrostilbene, diazotization, coupling to 2-napthylamine, oxidation and subsequent reaction with thionyl chloride, the 4'-methoxy-4-[2(2H - naphtho[1,2]triazolyl)] - 2 - stilbenecarbonyl chloride formed was treated with 2-(N,N-di-n-butyl)aminoethanol by the procedure given in Example 2 to give the brightener 2-(N,N-di-n-butyl)ethyl 4' - methoxy-4-[2-(2H-naphtho[1,2]triazolyl)]-2-stilbenecarboxylate.

This brightener was applied on polyacrylonitrile fibers (Orlon) by the method employed in Example 1. The treated cloth was much brighter in appearance than the untreated Dacron fabric.

EXAMPLE 8

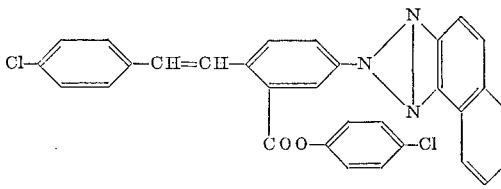

A mixture of 22 grams of 4'-chloro-4-[2-(2H-naphtho[1,2]triazolyl)]-2-stilbenecarbonyl chloride (prepared as in Example 1), 6.4 grams of p-chlorophenol, 5 grams of anhydrous pyridine and 100 grams of toluene was warmed gradually to 90° C. and heated for 5 hours at 90–95° C. on the steam bath. After evaporation of the solvent under reduced pressure, the residue was washed with water and purified by dissolving in ethylene glycol monomethyl ether containing animal charcoal, filtering hot, and then adding water to the clear filtrate to precipitate the brightener. After drying at 40° C. under reduced pressure there was obtained as a yellow powder the brightener p-chlorophenyl 4'-chloro-4-[2-(2H-naphtho[1,2]triazolyl)] - 2 - stilbenecarboxylate.

The brightener was applied on nylon by the method given in Example 1. The treated cloth appeared much whiter than the untreated nylon swatch.

EXAMPLE 9

10 grams of dimethyl terephthalate, 4.85 grams of ethylene glycol and 0.003 gram of metallic sodium, as a catalyst, were heated for 3 hours at 200° C. in a stream of pure nitrogen. At the end of 3 hours, 0.30 gram of the brightener of Example 1 was added to the resulting polymer. The low molecular weight polymer was then heated at 280° C. for 30 minutes, then further heated for 10 hours in a vacuum. During the heat conversion, a slow current of nitrogen was introduced through a capillary tube. The final product melted at 260° C. The methyl alcohol formed as a by-product of the ester interchange was removed during the heating period. The final product as formed was extruded in molten form as a ribbon cooled with a water spray, then cut into chips. The chips were melted in the absence of air and water, then extruded through orifices to give them the desired shape. The shaped articles can be converted into fibers in continuous filament form or cut into short segments as staple. Both filaments and short segments showed a noticeable whitening effect. The same results are obtained with the brighteners of Examples 2 to 8.

EXAMPLE 10

The brightener of Example 1 and a similar brightener compound with the carbethoxy group replaced by a carboxyl group were compared on Dacron as follows:

Each of the brighteners was made up in separate solutions by dissolving 0.05 g. of each in 100 ml. of dimethyl formamide containing 0.5 ml. of a 4% caustic soda solution. 0.03% (on the weight of Dacron) of these solutions was made up to 150 ml. with water containing 0.17% (by weight) of Peregal O. 5.0 g. of Dacron 54 was dyed in each bath for 45 minutes at 200° F., rinsed and dried. Brighteners readings taken with a standard U.V. light fluorescent photometer showed a value of 62 for the swatch dyed with the compound of Example 1 and a value of only 45 for the swatch dyed with the carboxy compound.

While the values indicate that the compound of Example 1 is about 50% more efficient than the carboxy brightener, the advantages of the brightener of Example 1 are even more marked than this due to the fact that the brightened sample treated with the compound of Example 1 is a brilliant white whereas the other, although brighter than an untreated swatch, is distinctly yellow, and therefore very unsatisfactory as a commercial product.

We claim:

1. A composition comprising an organic carrier selected from the group consisting of polyesters, polyamides, polyacrylonitrile and in brightening amounts a fluorescent naphthotriazole compound having the following formula:

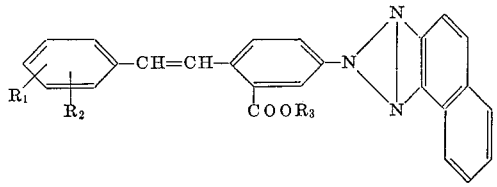

wherein $R_1$ and $R_2$ represent a member selected from the class consisting of hydrogen, chlorine, bromine and fluorine, lower alkyl and lower alkoxy, and $R_3$ represents a member selected from the class consisting of alkyl, hydroxyalkyl, dihydroxyalkyl, trihydroxyalkyl, dialkylaminoalkyl, morpholino-N-alkyl and piperidino-N-alkyl wherein the alkyl group contains from 1 to 4 carbon atoms, and hexamethyleneimino-N-ethyl.

2. A composition as defined in claim 1 wherein $R_1$ is para-chloro, $R_2$ is hydrogen and $R_3$ is ethyl.

3. A composition as defined in claim 1 wherein $R_1$ and $R_2$ are hydrogen and $R_3$ is $-C_2H_4N(CH_3)_2$.

4. A composition as defined in claim 1 wherein $R_1$ is para-chloro, $R_2$ is hydrogen and $R_3$ is $$-C_2H_4N\begin{matrix} CH_2-CH_2 \\ \diagdown \\ CH_2-CH_2 \end{matrix}O$$

5. A composition as defined in claim 1 wherein $R_1$ is para-chloro, $R_2$ is hydrogen, and $R_3$ is hydroxyethyl.

6. A composition as defined in claim 1 wherein $R_1$ is para-methyl, $R_2$ is hydrogen, and $R_3$ is $-C_2H_4N(CH_3)_2$.

7. A composition as defined in claim 1 wherein $R_1$ is para-chloro, $R_2$ is hydrogen and $R_3$ is

8. A composition as defined in claim 1 wherein $R_1$ is para-chloro, $R_2$ is ortho-chloro, and $R_3$ is n-butyl.

9. A composition as defined in claim 1 wherein $R_1$ is para-methoxy, $R_2$ is hydrogen, and $R_3$ is

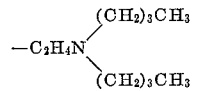

10. A composition as defined in claim 2 wherein the carrier is a polyester.

No references cited.

WILLIAM H. SHORT, *Primary Examiner.*

R. LYON, *Assistant Examiner.*

U.S. Cl. X.R.

260—78, 88.7; 252—301.2